(12) United States Patent
Hayashi et al.

(10) Patent No.: US 11,780,005 B2
(45) Date of Patent: Oct. 10, 2023

(54) METHOD FOR MANUFACTURING SINTERED BODY

(71) Applicant: SUMITOMO ELECTRIC SINTERED ALLOY, LTD., Takahashi (JP)

(72) Inventors: Shinji Hayashi, Takahashi (JP); Kenji Takeuchi, Takahashi (JP)

(73) Assignee: SUMITOMO ELECTRIC SINTERED ALLOY, LTD., Takahashi (JP)

(*) Notice: Subject to any disclaimer, the term of this patent is extended or adjusted under 35 U.S.C. 154(b) by 23 days.

(21) Appl. No.: 17/951,556

(22) Filed: Sep. 23, 2022

(65) Prior Publication Data

US 2023/0015355 A1   Jan. 19, 2023

Related U.S. Application Data

(62) Division of application No. 16/640,096, filed as application No. PCT/JP2017/029828 on Aug. 21, 2017, now Pat. No. 11,491,540.

(51) Int. Cl.
 *B29C 43/08* (2006.01)
 *B22F 3/03* (2006.01)
 *B30B 11/10* (2006.01)

(52) U.S. Cl.
 CPC ............. *B22F 3/03* (2013.01); *B30B 11/10* (2013.01); *B29C 43/08* (2013.01)

(58) Field of Classification Search
 CPC ......... B29C 43/08; B30B 11/02; B30B 11/08; B30B 11/10; B30B 11/34; B22F 3/03; B22F 3/164; B22F 3/24; B22F 2003/166
 See application file for complete search history.

(56) References Cited

U.S. PATENT DOCUMENTS

| | | | |
|---|---|---|---|
| 2,946,298 A | 7/1960 | Doepel et al. |
| 3,836,299 A | 9/1974 | Houston et al. |
| 6,595,767 B1 | 7/2003 | Hinzpeter et al. |
| 8,114,328 B2 | 2/2012 | Sowden et al. |
| 9,445,971 B2 | 9/2016 | Anderson et al. |

FOREIGN PATENT DOCUMENTS

| | | |
|---|---|---|
| JP | H05-70807 A | 3/1993 |
| JP | H06-155094 A | 6/1994 |
| JP | 2006-263764 A | 10/2006 |
| JP | 2011-80113 A | 4/2011 |
| JP | 2014-156659 A | 8/2014 |

*Primary Examiner* — Thu-Khanh T. Nguyen
(74) *Attorney, Agent, or Firm* — Faegre Drinker Biddle & Reath LLP

(57) ABSTRACT

Provided is a sizing apparatus including: a die set including a die plate that holds a die provided with a through hole to which a workpiece is to be supplied, and upper and lower punches that are to be inserted into the through hole to press the workpiece; a press main body that includes punch driving mechanisms that actuate the punches and in which the die set is configured to be attached to and detached from a predetermined position; and a turntable that is rotated on the die plate and supplies a workpiece to the die and discharges a workpiece from the die. The die set includes the turntable, and a supporting base on which the turntable is placed. The supporting base includes an axis positioning portion that is provided coaxially with a central axis of the turntable and positions the central axis at a predetermined position of the supporting base.

10 Claims, 5 Drawing Sheets

METHOD FOR MANUFACTURING SINTERED BODY

CROSS-REFERENCE TO RELATED APPLICATIONS

This application is a divisional of U.S. patent application Ser. No. 16/640,096, filed Feb. 19, 2022, which is a National Stage Entry of PCT/JP2017/029828, filed Aug. 21, 2017, the entire contents of each are incorporated by reference.

TECHNICAL FIELD

The present invention relates to a sizing apparatus and a method for manufacturing a sintered body.

BACKGROUND ART

Sizing apparatuses such as those disclosed in Patent Documents 1 and 2 are used to manufacture sintered parts with high dimensional accuracy. A conventional sizing apparatus has the same basic configuration as that of a pressing apparatus for manufacturing a powder compact to be sintered, and includes a die, upper and lower punches, and driving mechanisms for moving the punches up and down. Patent Documents 1 and 2 disclose sizing apparatuses further including a turntable that is rotated on a die plate holding the die to successively supply workpieces (sintered bodies) to the die and successively discharge sized workpieces. Patent Document 2 discloses an outer Geneva mechanism used as a rotation mechanism for the turntable. As disclosed in Patent Documents 1 and 2, the turntable is provided with a plurality of through holes (also referred to as "housing holes" hereinafter) for housing workpieces that are arranged at regular intervals in the circumferential direction of the turntable. While the turntable is rotated, the housing holes are arranged at a workpiece supply position, a die molding position, a sized workpiece discharge position, and the like.

A die-set type sizing apparatus that employs a replaceable die set including a die and upper and lower punches and in which the die set is configured to be attached to and detached from a press main body including punch driving mechanisms is one type of conventional sizing apparatus (a similar technology is disclosed in Patent Document 3).

CITATION LIST

Patent Documents

Patent Document 1: JP 2011-080113A
Patent Document 2: JP 2014-156659A
Patent Document 3: JP H06-155094A

SUMMARY OF INVENTION

A sizing apparatus of the present disclosure includes:
a die set including a die plate that holds a die provided with a through hole to which a workpiece is to be supplied, and upper and lower punches that are to be inserted into the through hole to press the workpiece;
a press main body that includes punch driving mechanisms that actuate the punches and in which the die set is configured to be attached to and detached from a predetermined position; and a turntable that is rotated on the die plate and supplies a workpiece to the die and discharges a workpiece from the die,
wherein the die set includes the turntable, and a supporting base on which the turntable is placed, and
the supporting base includes an axis positioning portion that is provided coaxially with a central axis of the turntable and positions the central axis at a predetermined position of the supporting base.

A method for manufacturing a sintered body of the present disclosure includes
a step of sizing a sintered body using the above-mentioned sizing apparatus of the present disclosure.

DESCRIPTION OF EMBODIMENTS

Figure 1:
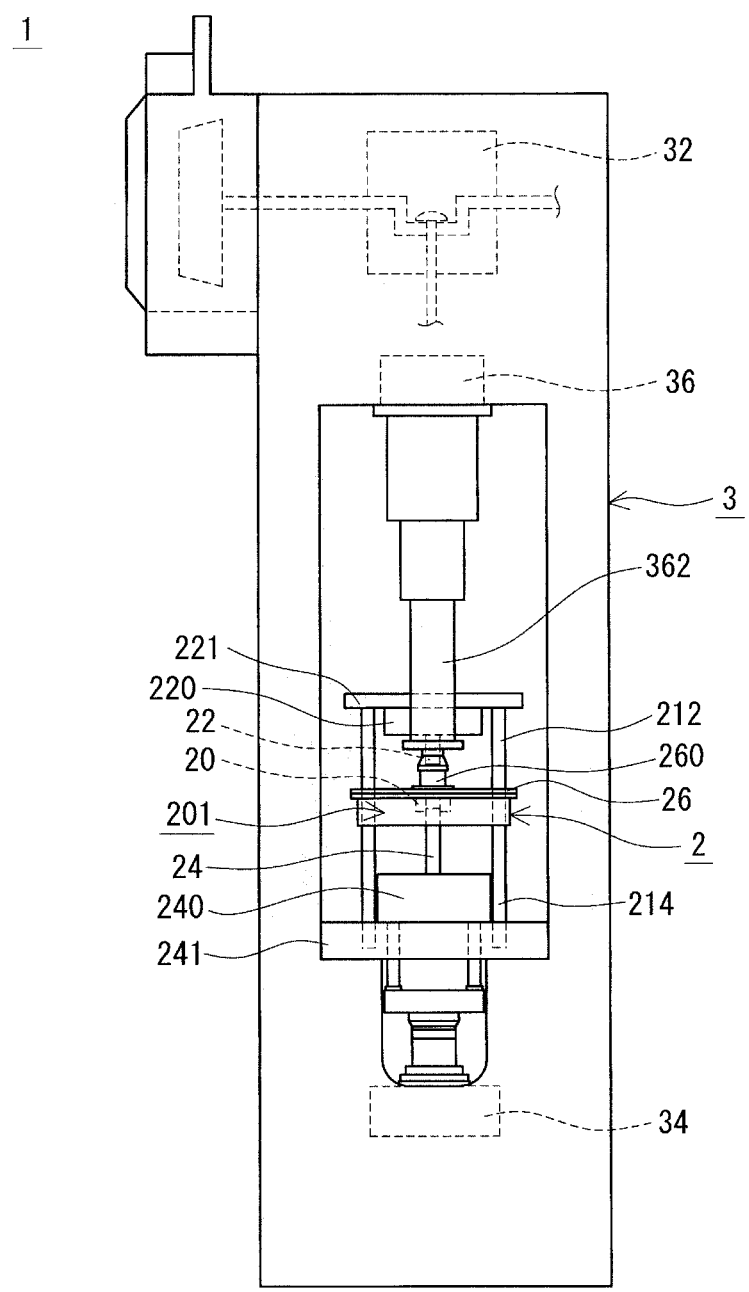
FIG. 1 is a schematic configuration diagram of a sizing apparatus of Embodiment 1.

Problem to be Solved by the Present Disclosure

There is demand for the improvement in replaceability of a die set in a die-set type sizing apparatus including the above-described turntable.

In a conventional sizing apparatus, a turntable is attached to a press main body. Specifically, a shaft portion that supports the turntable such that the turntable can be rotated between a position in the press main body at which the turntable is attached during the sizing operation and a position for the replacement of a die set is provided on the lateral side of the press main body. The shaft portion is located outward with respect to the circumferential edge of the turntable. The die set is replaced in such a sizing apparatus as described below. In a state in which the turntable is rotated about the above-mentioned shaft portion and arranged at a position for the replacement of a die set, the current die set is removed from the press main body, and then a new die set is attached at a predetermined position of the press main body. Next, the turntable is inversely rotated about the above-mentioned shaft portion and arranged at a position at which the turntable is attached while the apparatus is operating, and then, the central axes of the through holes provided in the die of the new die set are aligned with the central axes of the housing holes of the turntable. Furthermore, as disclosed in Patent Documents 1 and 2, units for holding a workpiece may be fitted into the housing holes. If the turntable is attached to the press main body in this manner, operations such as the above-described alignment of the central axes and fitting of holding units need to be performed inside the press main body. In other words, the above-described operations need to be performed as an in-line set up, and thus the workability is poor. Moreover, since the above-described operations are performed inside the press main body, the sizing apparatus needs to not be operating, resulting in a decrease in the productivity of sintered parts.

To address this, one of the objects is to provide a sizing apparatus with which the replaceability of a die set is excellent. Another object is to provide a method for manufacturing a sintered body with which the productivity of sintered parts is excellent.

Advantageous Effects of the Present Disclosure

With the sizing apparatus of the present disclosure, the replaceability of a die set is excellent. With the method for manufacturing a sintered body of the present disclosure, the productivity of sintered parts is excellent.

Description of Embodiments of the Present Invention

First, embodiments of the invention of the present application will be listed and described.

(1) A sizing apparatus according to an aspect of the invention of the present application includes:
- a die set including a die plate that holds a die provided with a through hole to which a workpiece is to be supplied, and upper and lower punches that are to be inserted into the through hole to press the workpiece;
- a press main body that includes punch driving mechanisms that actuate the punches and in which the die set is configured to be attached to and detached from a predetermined position; and
- a turntable that is rotated on the die plate and supplies a workpiece to the die and discharges a workpiece from the die,
- wherein the die set includes the turntable, and a supporting base on which the turntable is placed, and
- the supporting base includes an axis positioning portion that is provided coaxially with a central axis of the turntable and positions the central axis at a predetermined position of the supporting base.

In the above-mentioned sizing apparatus, the die set includes the turntable. Therefore, operations such as the alignment of the central axis of the through hole of the die with the central axis of the housing hole of the turntable and the fitting of holding units into the housing holes of the turntable can be performed outside the press main body. In other words, the above-described operations can be performed without stopping the production line. Accordingly, with the above-mentioned sizing apparatus, the above-described operations can be easily performed when the die set is replaced, compared with a conventional sizing apparatus in which the above-described operations are performed inside the press main body, and thus the replaceability of the die set is excellent. In addition, the above-described operations can be performed while the above-mentioned sizing apparatus is operating. Accordingly, the downtime of the above-mentioned sizing apparatus can be reduced compared with the above-described conventional sizing apparatus, thus contributing to an improvement in the productivity of a sintered part.

(2) In an embodiment of the above-mentioned sizing apparatus,
the press main body includes a table driving mechanism that rotates the turntable.

With the above-mentioned embodiment, the configuration of the die set can be simplified compared with the case where a die set includes a table driving mechanism, and assemblability of the die set is excellent.

(3) A method for manufacturing a sintered body according to an aspect of the invention of the present application includes includes
a step of sizing a sintered body using the sizing apparatus according to (1) or (2) above.

In the above-mentioned method for manufacturing a sintered body, the above-mentioned sizing apparatus of the present disclosure is used with which the downtime of a sizing apparatus due to the replacement of a die set can be reduced as described above. Accordingly, with the above-mentioned method for manufacturing a sintered body, sintered bodies with excellent dimensional accuracy can be produced on a large scale, and thus the productivity of a sintered part is excellent.

Details of Embodiments of the Present Invention

Hereinafter, an embodiment of the present disclosure will be specifically described with reference to the drawings. In the figures, components having the same name are denoted by the same reference numeral.

Embodiment 1

Hereinafter, a sizing apparatus 1 of Embodiment 1 will be described with reference to FIGS. 1 to 5. In FIGS. 1 to 5, an outline of the configuration is schematically shown to facilitate understanding.

Schematic Configuration

Figure 4:
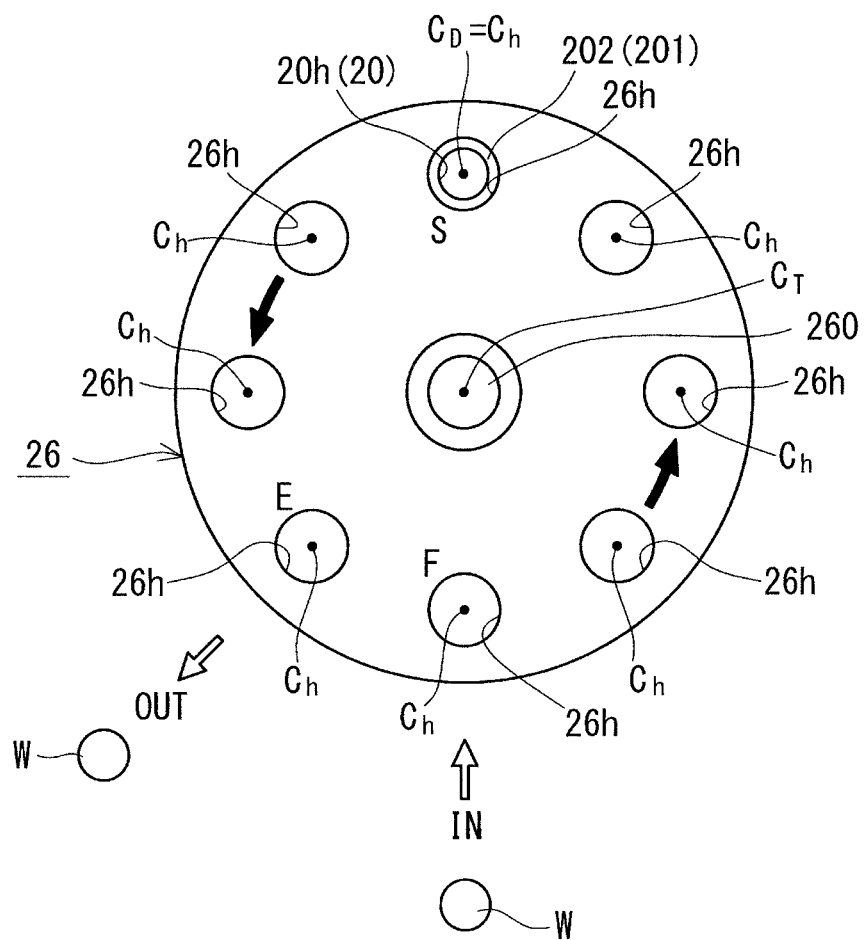
FIG. 4 is a plan view illustrating a turntable included in the sizing apparatus of Embodiment 1.

The sizing apparatus 1 of Embodiment 1 is a pressing apparatus used for sizing the dimensions of a sintered body (workpiece W in FIG. 4). As shown in FIG. 1, the sizing apparatus 1 is a die-set type sizing apparatus including a die set 2 that includes a die 20 and upper and lower punches (upper punch 22 and lower punch 24), and a press main body 3 that includes punch driving mechanisms (upper punch driving mechanism 32 and lower punch driving mechanism 34) and in which the die set 2 is configured to be attached to and detached from a predetermined position. In addition, the sizing apparatus 1 includes a turntable 26 that is provided with a plurality of housing holes 26h (see FIGS. 4 and 5) for housing workpieces W, and supplies a workpiece W to the die 20 and discharges a sized workpiece W from the die 20.

In particular, the die set 2 of the sizing apparatus 1 of Embodiment 1 includes the turntable 26, and as is the case with the die 20, the upper punch 22, and the lower punch 24, the turntable 26 is one of the replaceable parts of the press main body 3. The following are more specific descriptions.

Die Set

Schematic Configuration

Figure 2:
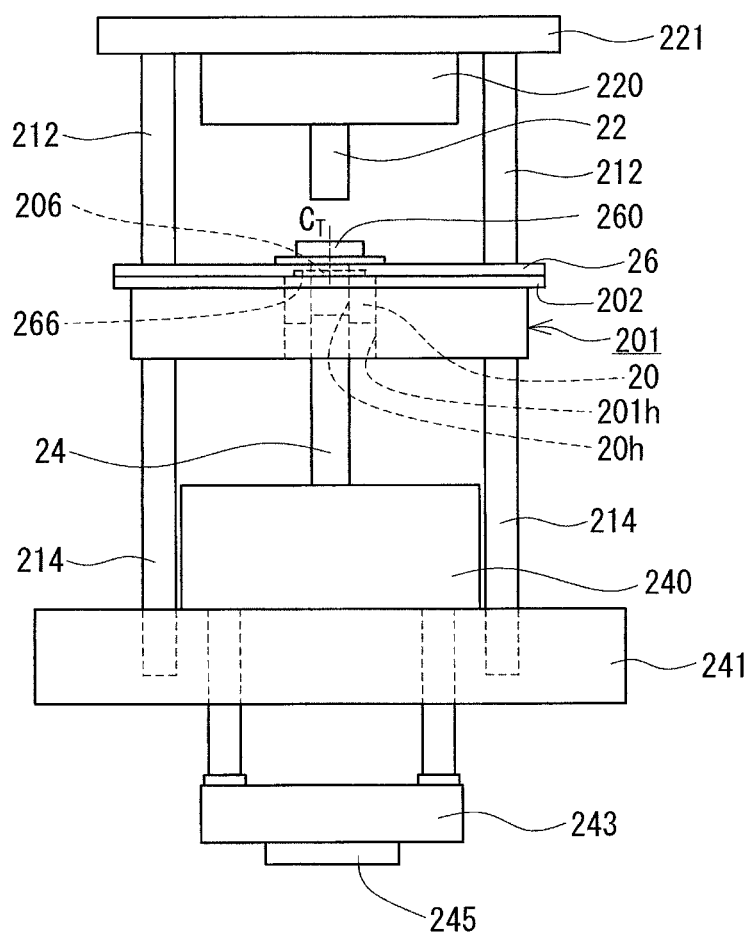
FIG. 2 is a schematic configuration diagram of a die set included in the sizing apparatus of Embodiment 1.

The die set 2 will be described with reference mainly to FIG. 2.

The die set 2 is an assembly to which the die 20, the upper punch 22, and the lower punch 24 can be set outside the press main body 3 (see FIGS. 1 and 3), and these elements are prepared in accordance mainly with the outline shape of a workpiece W. The die set 2 includes the die 20 provided with a through hole (die hole 20h) to which a workpiece W is to be supplied, a die plate 201 that holds the die 20, and the upper punch 22 and lower punch 24 that are to be inserted into the die hole 20*h* to press the workpiece W. The die set 2 of this embodiment further includes an upper punch plate 221 that holds the upper punch 22, a base plate 241 that holds the lower punch 24, upper guide posts 212 that couple the upper punch plate 221 and the die plate 201, and lower guide posts 214 that couple the die plate 201 and the base plate 241. With the sizing apparatus 1 of Embodiment 1, the die set 2 further includes the turntable 26 that is rotated on the die plate 201.

Die and Punches

The die 20, the upper punch 22, and the lower punch 24 are die members for sizing the dimensions of a workpiece W to predetermined dimensions. The die 20 is provided with the die hole 20*h* having a predetermined shape corresponding to the outline shape of the workpiece W. The upper punch 22 and the lower punch 24 have pressing surfaces corresponding to the outline shape of the workpiece W. The lower punch 24 is inserted through the lower opening of the die hole 20*h*, and the inner circumferential surface forming the die hole 20*h* and the pressing surface of the lower punch 24 form a closed-end cavity together. The upper punch 22 is inserted through the upper opening of the die hole 20*h*, and the upper punch 22 and the lower punch 24 press the workpiece W housed in the cavity to size the workpiece W to have predetermined dimensions.

Die Plate

Figure 5:
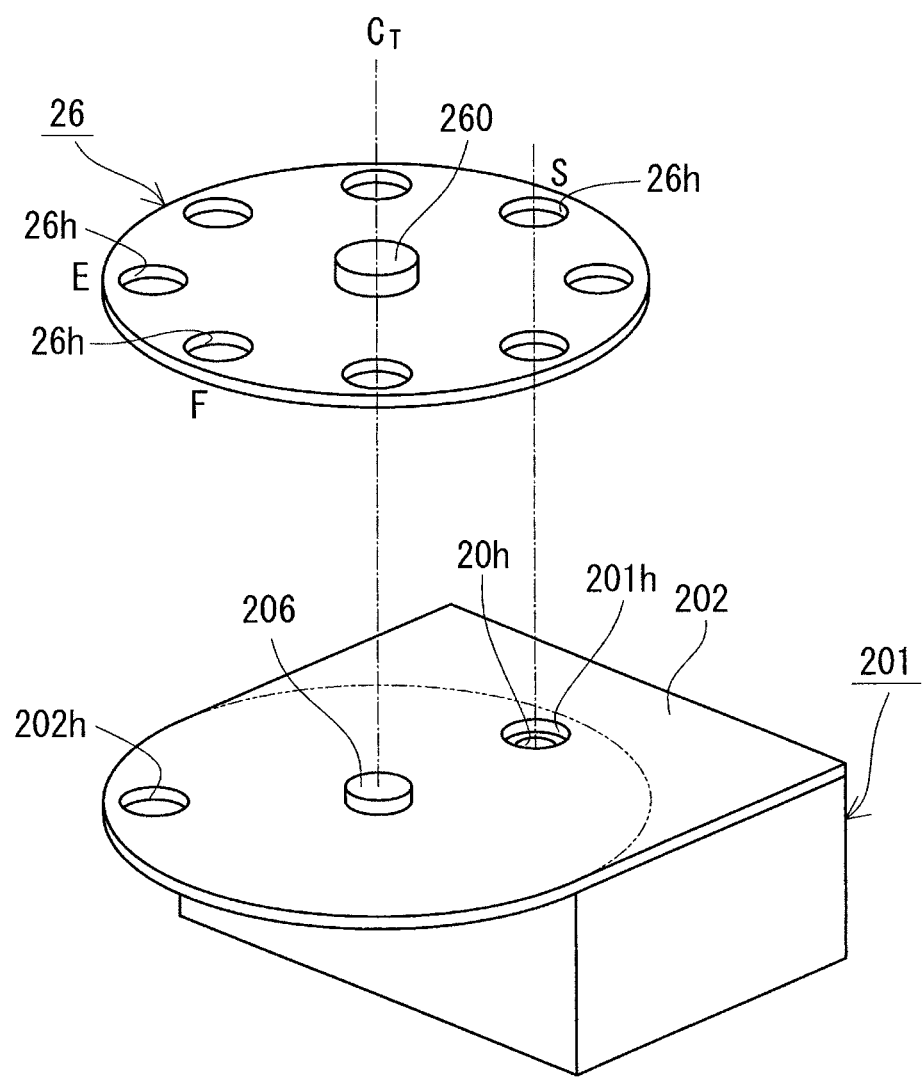
FIG. 5 is an exploded perspective view of a die plate and the turntable included in the sizing apparatus of Embodiment 1.

The die plate 201 is provided with an attachment hole for the die 20, and holds the die 20 fitted into the attachment hole. The die plate 201 of this embodiment includes a rectangular parallelepiped main body portion that holds the die 20, and a plate-like supporting base 202 that is provided on the main body portion and on which the turntable 26 is placed (see also FIG. 5). The supporting base 202 has a tongue-like shape that is a combination of a rectangle corresponding to the main body portion and a semicircle whose diameter is one side of the rectangle, and the semicircular portion protrudes from the main body portion (see FIG. 5). In a state in which the turntable 26 is placed on the supporting base 202, approximately a half of the turntable 26 is supported by the region on the main body portion side, and a remaining half is supported by the region of the semicircular portion. Therefore, a half of the turntable 26 is arranged protruding from the main body portion. In FIG. 5, a semicircular arc shown by a two-dot chain line in the supporting base 202 virtually indicates the outer edge of the turntable 26 placed thereon. The size of the semicircular portion of the supporting base 202 is adjusted such that the circumferential edge of the semicircular portion substantially corresponds to the outer edge of the turntable 26. Since the region of the supporting base 202 on which the turntable 26 is to be placed has substantially the same size as the size of the turntable 26, the supporting base 202 can stably support the turntable 26.

In the above-described main body portion and supporting base 202, an insertion hole 201*h* is locally provided near the die 20 such that the upper punch 22 and the lower punch 24 can be inserted into the die hole 20*h* (see also FIG. 5). It is preferable that the diameter of the opening of the insertion hole 201*h* is larger than the diameter of the opening of the die hole 20*h* as shown in this embodiment, and is larger than or equal to those of the housing holes 26*h* of the turntable 26, which will be described later. The reason for this is that the upper punch 22 and the lower punch 24 can be inserted into the die hole 20*h* with no difficulty, and a workpiece W can be more reliably supplied from the housing hole 26*h* via the insertion hole 201*h* to the die hole 20*h*. In addition, in this embodiment, the supporting base 202 is provided with a through hole (discharge hole 202*h*; see FIG. 5) for discharging a sized workpiece W at a position that overlaps the housing hole 26*h* arranged at a discharge position E (which will be described later; see FIG. 5) of the turntable 26. If the die plate 201 is additionally provided with a slide (not shown) on which a workpiece W slides down from the discharge hole 202*h* toward the die hole 20*h*, the workpiece W can be smoothly supplied to the die hole 20*h*. Configurations in which the discharge hole 202*h* and a slide are provided are merely examples, and these elements can also be omitted.

In the supporting base 202 of this embodiment, an axis positioning portion 206 for positioning the central axis $C_T$ of the turntable at a predetermined position is provided on the surface on which the turntable 26 is to be placed. In this embodiment, the central axis of a circular region (circular region formed by the circumferential edge of the semicircular portion of the supporting base 202 and the semicircular portion indicated by a two-dot chain line in FIG. 5) on the placement surface of the supporting base 202 on which the turntable 26 is to be placed is used as the central axis of the axis positioning portion 206. The axis positioning portion 206 is provided such that the central axis thereof is coaxial with the central axis $C_T$ of the turntable 26. The axis positioning portion 206 can be configured as appropriate such that the central axis $C_T$ of the turntable 26 can be positioned at a predetermined position of the supporting base 202. The axis positioning portion 206 of this embodiment is a columnar protrusion, and the turntable 26 is provided with a recessed portion (attachment hole 266) into which this protrusion is to be fitted (see also the section "Turntable" below). In addition, the turntable 26 may also be provided with a through hole or the like into which a protrusion serving as the axis positioning portion 206 is to be inserted, instead of the above-mentioned recessed portion.

The surface of the supporting base 202 on which the turntable 26 is to be placed is flat apart from the portions at which the insertion hole 201*h*, the discharge hole 202*h*, and the axis positioning portion 206 are formed (see FIG. 5). Accordingly, in the state in which the turntable 26 is placed on the supporting base 202, the lower openings of the housing holes 26*h* (see FIG. 5) excluding those arranged overlapping the positions at which the insertion hole 201*h* and the discharge hole 202*h* are formed are blocked by the supporting base 202, thus making it possible to prevent workpieces W from falling off the housing holes 26*h*.

Turntable

Hereinafter, the turntable 26 will be described with reference mainly to FIG. 4.

The turntable 26 is a disk-like member that is rotated on the above-described die plate 201 and is used to convey workpieces W. A plurality of through holes are provided in a region on the outer circumferential side of the turntable 26 at regular intervals in the circumferential direction of the turntable 26. The through holes are used as the housing holes 26*h* for housing workpieces W before and after sizing processing. Typically, the housing holes 26*h* are circular holes having the same shape and the same inner diameter, and the inner diameter is larger than the diameter of the largest circle including a workpiece W. FIG. 4 shows a turntable 26 provided with eight housing holes 26h in total as an example. The number of housing holes 26h can be changed as appropriate.

While the turntable 26 is rotated, the housing holes 26h are arranged at a workpiece supply position F at which a workpiece W is supplied from the outside of the sizing apparatus 1 (see FIG. 1), a molding position S at which the workpiece W is supplied to the die 20 and molded, a discharge position E at which the sized workpiece W is discharged from the die 20 to the outside of the sizing apparatus 1, and the like. In this embodiment, positions that are opposite to each other in the direction along the diameter of the turntable 26 are taken as the molding position S and the supply position F, and the supply position F is located on the semicircular portion of the supporting base 202 (see also FIG. 5). A position of a housing hole 26h that is directly adjacent to (in FIG. 4, on the left side of) the supply position F in the circumferential direction of the turntable 26 is taken as the discharge position E. If a configuration is employed in which a conveyance mechanism (not shown) such as a belt conveyor for conveying workpieces W is provided near the supply position F of the turntable 26 and the workpiece W is supplied from this conveyance mechanism to the housing hole 26h using a handling robot (not shown) or the like, the workpieces W can be automatically supplied in succession. At the housing hole 26h located at the molding position S, a workpiece W falls from this housing hole 26h via the insertion hole 201h (see FIG. 5) toward a cavity formed by the die 20 (die hole 20h) and the lower punch 24, and thus the workpiece W can be automatically supplied to the above-mentioned cavity. After the sizing processing, the workpiece W removed from the die 20 is lifted up by the lower punch 24 (see FIG. 1) and is housed again in the housing hole 26h located at the molding position S. At the housing hole 26h located at the discharge position E, the sized workpiece W falls from this housing hole 26h via the discharge hole 202h of the die plate 201 (see FIG. 5) to the outside of the die plate 201, and thus the workpiece W is automatically discharged to the outside of the sizing apparatus 1. If a conveyance mechanism (not shown) such as a belt conveyor for conveying workpieces W is provided under the discharge hole 202h, the sized workpieces W can be automatically conveyed to the subsequent process.

The turntable 26 of this embodiment is a member that is attachable to and detachable from the die plate 201, and is provided, as a portion that is to be engaged with the die plate 201, an attachment hole 266 (see FIG. 2) to which the above-described axis positioning portion 206 is fitted. The attachment hole 266 of this embodiment is a circular hole that is open in a surface (lower surface in FIG. 2) of the turntable 26 facing the die plate 201 and has the central axis coaxial with the central axis $C_T$ of the turntable 26. When the turntable 26 shown in FIG. 5 is viewed from the lower side, a circular recessed portion is formed at a position corresponding to a connection portion 260, which will be described later, and this recessed portion is used as the attachment hole 266. In this embodiment, the axis positioning portion 206 of the die plate 201 is fitted to the attachment hole 266 of the turntable 26, thus making it possible to automatically position the turntable 26 with respect to the die plate 201 with high accuracy. That is, the axial alignment of the central axis of the supporting base 202 of the die plate 201 with the central axis $C_T$ of the turntable 26, the axial alignment of the central axis $C_D$ of the die hole 20h with the central axis $C_h$ of the housing hole 26h of the turntable 26 located at the molding position S, and the like can be automatically performed. In addition, in this embodiment, due to the above-mentioned fitting, the housing hole 26h of the turntable 26 located at the molding position S automatically corresponds to the insertion hole 201h of the supporting base 202, and the housing hole 26h located at the discharge position E automatically corresponds to the discharge hole 202h. Accordingly, the above-described axial alignment of the central axes, the alignment of the holes, and the like performed by an operator are substantially unnecessary, thus making it possible to reduce the time necessary for the axial alignment.

Furthermore, the turntable 26 of this embodiment is provided with a connection portion 260 that is to be connected to a transmission portion 362 (see FIG. 1) for transmitting rotating force produced by a table driving mechanism 36 (see FIG. 1), which will be described later, to the turntable 26, on the surface (upper surface in FIG. 2) facing the upper punch 22. The connection portion 260 of this embodiment is a columnar base protruding from the surface facing the upper punch 22 toward the upper punch 22 side (upward in FIG. 2), and is provided coaxially with the central axis $C_T$ of the turntable 26. The turntable 26 is assembled to the table driving mechanism 36 via the connection portion 260 and the transmission portion 362 such that rotating force produced by the table driving mechanism 36 is transmitted to the turntable 26 (see FIG. 1), and is rotated by the table driving mechanism 36. The shape and size of the connection portion 260 can be selected as appropriate depending on the table driving mechanism 36 and the transmission portion 362. It should be noted that, if a configuration in which the turntable 26 can be rotated by the table driving mechanism 36 is employed, the connection portion 260 and the transmission portion 362 can be omitted.

In addition, in this embodiment, workpiece holding portions (not shown) corresponding to the outline shapes of workpieces W are fitted to the housing holes 26h of the turntable 26. Each of the workpiece holding portions may be provided with an insertion hole corresponding to the outline shape of a workpiece W and include an indenter (e.g., ball plunger) that protrudes from the inner circumferential surface of the insertion hole toward the inner space of the insertion hole and holds the workpiece W. Workpiece holding portions having known configurations can be used (see Patent Documents 1 and 2). When a configuration is employed in which workpiece holding portions are configured to be attached to and detached from the housing holes 26h of the turntable 26, a single turntable 26 can be commonly used for workpieces W having various shapes and sizes.

Other Plates and Assembled State

The description in this section will be made with reference mainly to FIG. 2.

In this embodiment, the upper punch plate 221, the turntable 26, the die plate 201, and the base plate 241 are arranged in this order from top to bottom, and the upper guide posts 212 and the lower guide posts 214 are arranged between the plates.

The die set 2 of this embodiment includes a holder 220 that holds the upper punch 22, and the upper punch plate 221 that supports the holder 220. The upper punch plate 221 is attached to the press main body 3. In this embodiment, the upper punch 22 is moved up by an air cylinder (not shown), and is moved down by an upper punch driving mechanism 32. When the upper punch driving mechanism 32 is operated, the upper punch plate 221 is moved down, and thus the upper punch 22 is also moved down.

The die set 2 of this embodiment also includes a lower punch plate 240 that holds the lower punch 24, the base plate 241 fixed to the press main body 3, and a movable plate 243 provided with a connection portion 245 that is connected to a lower punch driving mechanism 34. The lower punch plate 240 and the movable plate 243 are coupled together using rods that are inserted into the base plate 241. When the lower punch driving mechanism 34 is operated, the movable plate 243 is moved up relative to the base plate 241, which is a fixed plate, and thus the lower punch plate 240 and the lower punch 24 are also moved up. When the lower punch driving mechanism 34 is stopped, the lower punch 24 moves down due to the weight thereof.

In this embodiment, the base plate 241 is fixed to the press main body 3, and therefore, the position of the die 20 in the vertical direction relative to the press main body 3 does not substantially change, and the upper punch 22 and the lower punch 24 are moved up and down relative to the press main body 3.

Press Main Body

Schematic Configuration

Figure 3:
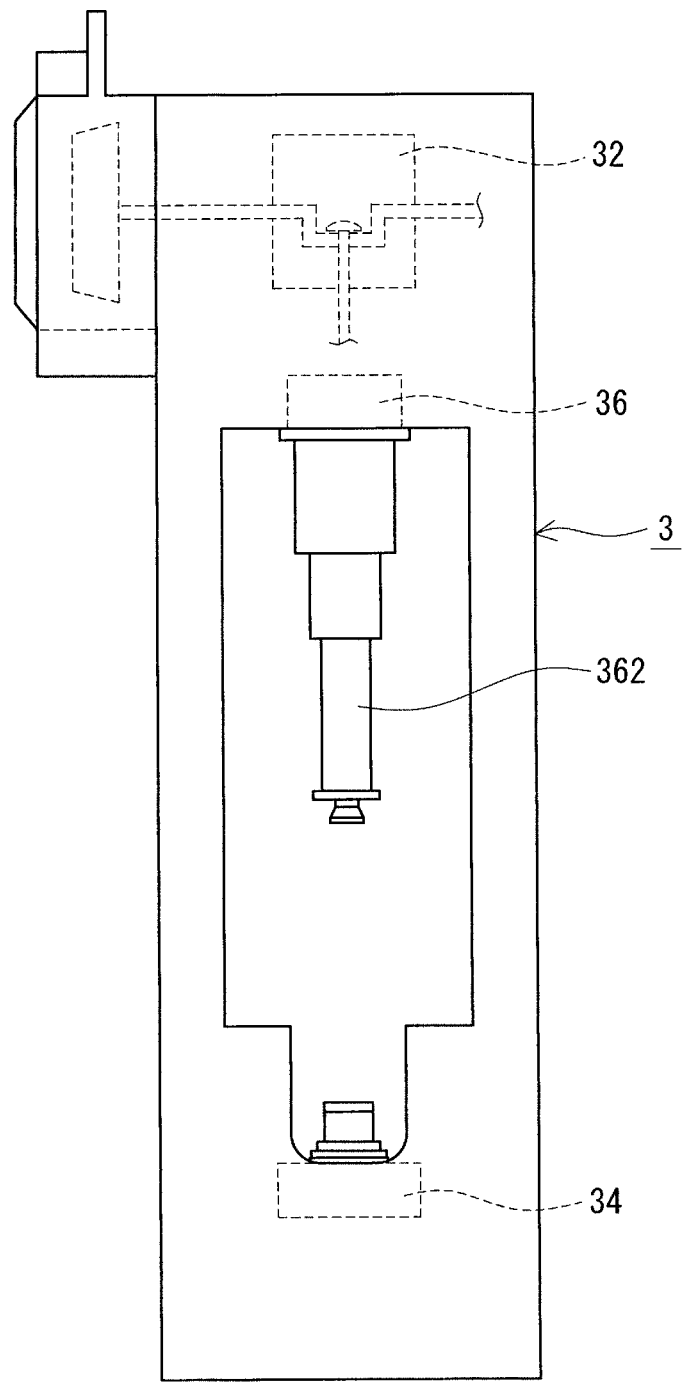
FIG. 3 is a schematic configuration diagram of a press main body included in the sizing apparatus of Embodiment 1.

Hereinafter, the press main body 3 will be described with reference mainly to FIG. 3.

The press main body 3 includes driving mechanisms that actually actuate the upper punch 22 and the lower punch 24 included in the die set 2 attached at a predetermined position. Specifically, the press main body 3 includes the upper punch driving mechanism 32 that is coupled to the upper punch 22 and actuates the upper punch 22, and the lower punch driving mechanism 34 that is coupled to the lower punch 24 and actuates the lower punch 24. The press main body 3 of this embodiment further includes a table driving mechanism 36 that rotates the turntable 26.

Punch Driving Mechanism

Various mechanisms that can move the upper punch 22 down and move the lower punch 24 up as described above, such as hydraulic ram cylinders, can be used as the upper punch driving mechanism 32 and the lower punch driving mechanism 34. An operating oil is used to drive a hydraulic ram cylinder. The press main body 3 includes a power source (not shown) such as a motor that supplies the above-mentioned operating oil to the cylinder. It should be noted that, in this embodiment, the upper punch driving mechanism 32 is located on the rear side of the press main body 3 (the back side of the plane of FIGS. 1 and 3), the table driving mechanism 36 is located on the front side of the press main body 3 (the front side of the plane of FIGS. 1 and 3), and the positions of these driving mechanisms in the front-rear direction are misaligned. A clutch, a brake, a flywheel, and the like included in the upper punch driving mechanism 32 are provided at a portion on the side surface of the press main body 3 that is near the rear surface of the press main body 3.

When hydraulic ram cylinders are used for the upper punch driving mechanism 32 and the lower punch driving mechanism 34, the upper punch 22 and the upper punch driving mechanism 32 are coupled via a hose portion (not shown) through which the operating oil flows, and the lower punch 24 and the lower punch driving mechanism 34 are also coupled via a hose portion. For example, the die set 2 may include hose pieces with a coupler (not shown) that are coupled to the upper punch 22 and the lower punch 24, and the press main body 3 may include hose pieces with a coupler (not shown) that are coupled to the upper punch driving mechanism 32 and the lower punch driving mechanism 34. When the die set 2 is attached to the press main body 3, continuous hose portions can be formed by connecting the couplers on the die set 2 side to the couplers on the press main body 3 side.

Table Driving Mechanism

Rotational actuators having various configurations that are used to rotate an index table can be used for the table driving mechanism 36. The table driving mechanism 36 of this embodiment includes an index device (commercially available product; not shown) including a roller-gear cam mechanism. The roller-gear cam mechanism of this embodiment is configured such that a driven pulley on the secondary side is rotated by one-eighth of a full rotation while a driving pulley on the primary side is rotated once. The rotation center of the driven pulley is coaxial with the central axis $C_T$ of the turntable 26. The press main body 3 includes a power source (e.g., a motor that rotates the driving pulley in this embodiment; not shown) that drives the index device.

It should be noted that, in the sizing apparatus 1 of this embodiment including the roller-gear cam mechanism as the table driving mechanism 36, the transmission portion 362 that transmits rotating force to the turntable 26 is arranged inside the outer edge of the turntable 26. On the other hand, in the above-described conventional sizing apparatus including an outer Geneva mechanism, the turntable 26 serves as a driven pulley, and a driving pulley serving as a member for transmitting rotating force is located outside the turntable 26.

Transmission Portion 362

The press main body 3 of this embodiment further includes the transmission portion 362 that directly transmits rotating force produced by the table driving mechanism 36 to the turntable 26. The transmission portion 362 of this embodiment is a rod-shaped member that is arranged coaxially with the central axis $C_T$ of the turntable 26 and couples the above-described driven pulley to the connection portion 260 of the turntable 26, and is arranged rising from the central portion of the turntable 26.

Other Configurations

In addition, the sizing apparatus 1 can include a movement mechanism (not shown) that moves the die set 2 to the press main body 3 side, various sensors that detect a movement state and the like, and a control unit (not shown) that controls the movement mechanism based on the information from the sensors and the like. The die set 2, which is a heavy object, can be moved to the press main body 3 easily and automatically by the control unit actuating the movement mechanism. Moreover, the sizing apparatus 1 may include a clamping mechanism (not shown) that fixes the die set 2 arranged at a predetermined position of the press main body 3, various sensors that detect a holding state and the like, and a control unit (not shown) that controls the clamping mechanism based on the information from the sensors and the like. Regarding the movement mechanism, the clamping mechanism, the control unit, and the like, known configurations (see Patent Document 3, for example) can be referred to.

Workpiece

A sintered body used as a workpiece W (see FIG. 4) may be typically a metal sintered body obtained by molding material powder constituted mainly by metal powder into a predetermined shape using a pressing apparatus and sintering the resulting powder compact. Examples of the metal powder include iron-based powder and aluminum-based powder. Although FIG. 1 shows a solid sintered body such as a columnar sintered body as an example, sintered bodies having various shapes, such as sintered bodies provided with a through hole (e.g., an annular sintered body and a tubular sintered body), can also be used. When an annular sintered body or a tubular sintered body is subjected to sizing processing, the die set 2 may include a core rod portion (not shown) to be inserted into the through hole of the sintered body, and the press main body 3 may include a driving mechanism (see the actuator for upward and downward movement in Patent Document 1, and so on) that actuates the core rod portion. The lower punch driving mechanism 34 may also serve as a driving mechanism for a core rod portion.

Replacement of Die Set

Hereinafter, a procedure to replace the die set 2 will be briefly described.

(1) The die set 2 is set outside the press main body 3. In this embodiment, the die set 2 is assembled such that the upper punch plate 221 and upper punch 22, the turntable 26, the die 20 and die plate 201, and the lower punch 24 and base plate 241 are arranged in that order from top to bottom as described above. Moreover, in this embodiment, the axial alignment of the central axis of the axis positioning portion 206 of the die plate 201 with the central axis $C_T$ of the turntable 26, the axial alignment of the central axis $C_D$ of the die hole 20h of the die 20 with the central axis $C_h$ of the housing hole 26h of the turntable 26, and the like are automatically performed by fitting the attachment hole 266 of the turntable 26 to the axis positioning portion 206 of the die plate 201 as described above.

(2) The die set 2 is moved to a predetermined position of the press main body 3. In this embodiment, the above-described movement mechanism and control unit are included, and thus this movement can be automatically performed. During this movement, the turntable 26 does not fall off the die plate 201 due to the above-described fitting, and is stably held by the die plate 201.

(3) The die set 2 arranged at the predetermined position of the press main body 3 is fixed to the press main body 3. In this embodiment, the above-described clamping mechanism and control unit are included, and thus a predetermined portion of the die set 2 (e.g., base plate 241) can be automatically held and fixed.

(4) The upper punch plate 221 is coupled to the upper punch driving mechanism 32, and the lower punch plate 240 (the connection portion 245 of the movable plate 243) is coupled to the lower punch driving mechanism 34. In this embodiment, the connection portion 260 of the turntable 26 is coupled to the transmission portion 362. Due to this coupling, driving the table driving mechanism 36 makes it possible to intermittently rotate the turntable 26 about the central axis $C_T$ of the turntable 26.

Method for Manufacturing Sintered Body

The sizing apparatus 1 of Embodiment 1 can be favorably used to manufacture sintered parts made of a sintered body (workpiece W). A method for manufacturing a sintered body of the embodiment includes a step of sizing a sintered body (workpiece W) using the sizing apparatus 1 of Embodiment 1. In this sizing step, a predetermined dimensional sizing can be performed by preparing die sets 2 depending on the shapes and sizes of workpieces W as described above and replacing the die set 2 in the press main body 3 as needed.

Major Effects

With the sizing apparatus 1 of Embodiment 1, the die set 2 includes the turntable 26, and therefore, the operations such as the alignment of the central axis $C_D$ of the die hole 20h with the central axis $C_h$ of the housing hole 26h of the turntable 26 located at the molding position S and the fitting of holding units into the housing holes 26h can be performed outside the press main body 3. Accordingly, with the sizing apparatus 1 of Embodiment 1, the above-described operations can be more easily performed when the die set 2 is replaced, compared with the above-described conventional sizing apparatus, and thus the replaceability of the die set 2 is excellent. In addition, the above-described operations can be performed while the sizing apparatus 1 of Embodiment 1 is operating. That is, the sizing processing using a current die set 2 attached to the sizing apparatus 1 and the setting of another die set 2 to be used in subsequent processing and so forth can be performed simultaneously. Accordingly, the downtime of the sizing apparatus 1 of Embodiment 1 can be reduced compared with the above-described conventional sizing apparatus, thus contributing to an improvement in the productivity of sintered parts.

Furthermore, the sizing apparatus 1 of this embodiment exhibits the following effects.

(1) The above-described central axes $C_D$ and $C_h$ can be coaxially aligned by fitting the attachment hole 266 of the turntable 26 to the axis positioning portion 206 of the die plate 201, and thus assemblability is excellent.

(2) Due to the fitting between the axis positioning portion 206 of the die plate 201 and the attachment hole 266 of the turntable 26, the above-described central axes $C_D$ and $C_h$, which has been coaxially aligned, do not become misaligned, and sizing processing can be stably performed for a long period of time from the beginning of use.

With the method for manufacturing a sintered body of the embodiment, the sizing apparatus 1 of Embodiment 1 is used for sizing the dimensions of a sintered body (workpiece W), thus making it possible to reduce the downtime of the sizing apparatus 1 and continuously manufacture sintered bodies having various shapes and sizes. Accordingly, with the method for manufacturing a sintered body of the embodiment, sintered bodies with excellent dimensional accuracy can be produced on a large scale, and thus the productivity of sintered parts is excellent.

The present invention is defined by the terms of the claims, but not limited to the configuration shown in the embodiment, and is intended to include any modifications within the meaning and scope equivalent to the terms of the claims.

For example, at least one of the following changes can be made.

(1) The die set 2 includes the table driving mechanism.
(2) The die plate 201 is not provided with the discharge hole 202h.

In these cases, a configuration may be employed in which a workpiece W is supplied to the die 20 and discharged from the die 20 by using an appropriate holding member such as a ball plunger to hold the workpiece W or using a robot to grasp the workpiece W.

LIST OF REFERENCE NUMERALS

1 Sizing apparatus
2 Die set
20 Die
20h Die hole (through hole)
201 Die plate
202 Supporting base
201h Insertion hole
202h Discharge hole
206 Axis positioning portion
22 Upper punch
220 Holder
221 Upper punch plate
24 Lower punch
240 Lower punch plate
241 Base plate
243 Movable plate
245 Connection portion
26 Turntable
26h Housing hole
260 Connection portion
266 Attachment hole
212 Upper guide post
214 Lower guide post
3 Press main body
32 Upper punch driving mechanism
34 Lower punch driving mechanism
36 Table driving mechanism
362 Transmission portion
W Workpiece
F Supply position
S Molding position
E Discharge position

The invention claimed is:

1. A method for manufacturing a sintered body by sizing a sintered body using a sizing apparatus comprising:
holding a die of a die plate of a die set, the die provided with a through hole to which a workpiece is to be supplied, and the die set including an upper punch and a lower punch that are inserted into the through hole to press the workpiece;
actuating the upper punch and the lower punch by a punch driving mechanism of a press main body, the die set being attachable to and detachable from a predetermined position in the press main body;
rotating a turntable having a plurality of housing holes on the die plate, the rotating of the turntable supplying a workpiece to the die and discharging a workpiece from the die, wherein the die plate includes a main body portion that holds the die, and a supporting base that is provided on the main body portion and on which the turntable is placed, the supporting base includes an axis positioning portion that is provided coaxially with a central axis of the turntable and positions the central axis at a predetermined position of the supporting base, and the die set includes the turntable, and is fixed to the press main body in a state in which the axis positioning portion positions the turntable relative to the die plate.

2. The method for manufacturing the sintered body by sizing the sintered body using the sizing apparatus according to claim 1, wherein the press main body includes a table driving mechanism that rotates the turntable.

3. The method for manufacturing the sintered body by sizing the sintered body using the sizing apparatus according to claim 2,
wherein the press main body includes a transmission portion for transmitting rotating force produced by the table driving mechanism to the turntable, and
the transmission portion is arranged inside an outer edge of the turntable in a state in which the die set is attached to the press main body.

4. The method for manufacturing the sintered body by sizing the sintered body using the sizing apparatus according to claim 2, wherein the table driving mechanism includes an index device including a roller-gear cam mechanism.

5. The method for manufacturing the sintered body by sizing the sintered body using the sizing apparatus according to claim 1,
wherein the supporting base is provided with a through hole through which the workpiece subjected to sizing processing is discharged, and
the through hole is provided in a portion of the supporting base that protrudes from the main body portion.

6. The method for manufacturing the sintered body by sizing the sintered body using the sizing apparatus according to claim 5, wherein the press main body includes a table driving mechanism that rotates the turntable.

7. The method for manufacturing the sintered body by sizing the sintered body using the sizing apparatus according to claim 6,
wherein the press main body includes a transmission portion for transmitting rotating force produced by the table driving mechanism to the turntable, and
the transmission portion is arranged inside an outer edge of the turntable in a state in which the die set is attached to the press main body.

8. The method for manufacturing the sintered body by sizing the sintered body using the sizing apparatus according to claim 6, wherein the table driving mechanism includes an index device including a roller-gear cam mechanism.

9. The method for manufacturing the sintered body by sizing the sintered body using the sizing apparatus according to claim 3, wherein the table driving mechanism includes an index device including a roller-gear cam mechanism.

10. The method for manufacturing the sintered body by sizing the sintered body using the sizing apparatus according to claim 9,
wherein the supporting base is provided with a through hole through which the workpiece subjected to sizing processing is discharged, and
the through hole is provided in a portion of the supporting base that protrudes from the main body portion.

\* \* \* \* \*